United States Patent
Lee et al.

(10) Patent No.: US 7,298,871 B2
(45) Date of Patent: Nov. 20, 2007

(54) SYSTEM AND METHOD FOR ADAPTING THE AMBIENCE OF A LOCAL ENVIRONMENT ACCORDING TO THE LOCATION AND PERSONAL PREFERENCES OF PEOPLE IN THE LOCAL ENVIRONMENT

(75) Inventors: Mi-Suen Lee, Ossining, NY (US); Hugo Strubbe, Yorktown Heights, NY (US)

(73) Assignee: Koninklijke Philips Electronics N.V., Eindohoven (NL)

( * ) Notice: Subject to any disclaimer, the term of this patent is extended or adjusted under 35 U.S.C. 154(b) by 806 days.

(21) Appl. No.: 10/165,286

(22) Filed: Jun. 7, 2002

(65) Prior Publication Data

US 2003/0227439 A1 Dec. 11, 2003

(51) Int. Cl.
*G06K 9/00* (2006.01)
(52) U.S. Cl. .................................... 382/115
(58) Field of Classification Search ................ 382/115, 382/118, 155; 700/47, 48
See application file for complete search history.

(56) References Cited

U.S. PATENT DOCUMENTS

| | | | |
|---|---|---|---|
| 5,745,126 A | 4/1998 | Jain et al. | 345/952 |
| 5,835,616 A | 11/1998 | Lobo et al. | 382/118 |
| 6,223,992 B1 | 5/2001 | Yasui et al. | 236/46 R |
| 6,400,835 B1* | 6/2002 | Lemelson et al. | 382/118 |
| 6,548,967 B1* | 4/2003 | Dowling et al. | 315/318 |
| 6,625,503 B1* | 9/2003 | Smith | 700/83 |
| 6,934,917 B2* | 8/2005 | Lin | 715/811 |
| 2002/0007510 A1* | 1/2002 | Mann | 4/300 |

FOREIGN PATENT DOCUMENTS

| | | |
|---|---|---|
| EP | 1102500 | 5/2001 |
| WO | WO9747066 | 12/1997 |
| WO | WO0031560 | 6/2000 |
| WO | WO0152478 | 7/2001 |
| WO | WO0159622 | 8/2001 |
| WO | WO0179952 | 10/2001 |

OTHER PUBLICATIONS

McKenna, Stephen et al., *Tracking Faces*, Proceedings of the Second Int'l Conference on Automatic Face and Gesture Recognition, Oct. 14-16, 1996, Killington VT, pp. 271-276.

(Continued)

Primary Examiner—Matthew C. Bella
Assistant Examiner—Tom Y Lu
(74) Attorney, Agent, or Firm—Yan Glickberg

(57) ABSTRACT

A system and method for automatically controlling systems and devices in a local environment, such as a home. The system comprises a control unit that receives images associated with one or more regions of the local environment. The one or more regions are each serviced by one or more servicing components. The control unit processes the images to identify, from a group of known persons associated with the local environment, any one or more known persons located in the regions. For the regions in which one or more known person is identified, the control unit automatically generates a control signal for at least one of the servicing components associated with the region, the control signal reflecting a preference of at least one of the known persons located in the respective region.

24 Claims, 3 Drawing Sheets

OTHER PUBLICATIONS

Gutta, S., et al., *Hand Gesture Recognition Using Ensembles Of Radial Basis Function (RBP) Networks And Decision Trees*, Int'l J. Of Pattern Recognition and Artificial Intelligence, vol. 11, No. 6, pp. 845-874 (1997).

Gutta, S., et al. *Mixture Of Experts For Classification of Gender, Ethnic Origin and Pose of Human Faces*, IEEE Transactions On Neural Networks, vol. 11, No. 4, (Jul. 2000), pp. 948-960.

* cited by examiner

SYSTEM AND METHOD FOR ADAPTING THE AMBIENCE OF A LOCAL ENVIRONMENT ACCORDING TO THE LOCATION AND PERSONAL PREFERENCES OF PEOPLE IN THE LOCAL ENVIRONMENT

FIELD OF THE INVENTION

The invention relates to adjusting the ambience, such as the lighting, temperature, noise level, etc., in a home or like interior environment.

BACKGROUND OF THE INVENTION

Certain home automation systems and techniques are known. Many known home automation systems and techniques may generally be classified as reactive to a real-time physical input. A well-known example are lights having attendant IR sensors (or like motion sensor), which will turn on when a person walks by, such as into a room. Such lights can often have an attendant daylight sensor (another real-time input), which will prevent the light from turning on when there is ambient daylight.

Other known home automation systems and techniques may generally be classified as pre-programmed to carry out certain functions when certain criteria are met. Many reactive systems are controlled by timers. For example, heating systems can be initiated automatically at a certain time of day, such as in the morning. Similarly, coffee makers can be automatically initiated at a specified time, so that a person has a cup of brewed coffee ready when he or she walks into the kitchen in the morning.

An example of a more complex home automation system is described in European Patent Application EP 1 102 500 A2 of Richton. The position of a wireless mobile unit (such as a wireless phone) carried by a person is used to determine the distance of the person to the home. Messages or instructions to perform certain actions based on the distance between the person and the home are generated and sent to a controller within the home. The controller causes the instruction to be enacted. For example, when the user is within a certain distance of the home, the home heating system may be instructed to turn on. Richton thus has features that are analogous to both a reactive system (i.e., a feature is engaged based upon proximity) and a pre-programmed system (i.e., engagement of a feature when certain pre-stored criteria are met).

Another example of a more elaborate pre-programmed type home automation system is described in PCT WO 01/52478 A2 of Sharood et al. In the Sharood system, existing home appliances and systems are connected to a control server. The user may control a selected appliance or system via a user interface that interacts with the server and can present graphic representations of the actual control inputs for the selected appliance or system. The user may therefore access the server and control appliances or systems remotely, for example, through an internet connection. In addition, the control server may be programmed so that certain appliances or systems are initiated and run under certain circumstances. For example, when a "vacation mode" is engaged, the lights are turned on at certain times for security purposes, and the heat is run at a lower temperature.

There are numerous deficiencies associated with the known home automation techniques and systems. For example, known reactive-type systems simply provide a fixed response when an input is received. Thus, for example, a motion sensor will switch on a light even if person would not otherwise want it on. Even a reactive system such as Richton, where certain reactions may be programmed, suffer from such a disadvantage. For example, a mobile phone that initiates certain functions in the home at certain distances that reflect a wife's preferences may create conditions that are not agreeable to a husband who is carrying his wife's phone.

Similarly, known pre-programmed type home automation systems have numerous deficiencies. For example, a timer that automatically turns on an appliance or system will do so unless it is turned off, thus creating situations that are undesirable or possibly unsafe. For example, if a person forgets to turn the timer of a coffee maker off on the day he or she has an early business meeting, a potential hazard may occur when the coffee maker is turned on later in the morning and remains on for the entire day. Likewise, for example, if the "vacation mode" is selected in Richton and a son or daughter who is unfamiliar with the system controls unexpectedly returns home from college for a weekend while the rest of the family is away, he or she may not be able to operate the lights, heating, etc. to their liking.

Other disadvantages of known home automation systems and techniques include an inability to identify a particular person and tailor a setting or response in the house to the preferences of the identified person. In addition, known systems and techniques do not respond with the preferred settings or responses based on the location of a particular person in the home. In addition, known systems and techniques do not respond with the preferred settings or responses of a number of persons based upon where they are located in the house.

SUMMARY OF THE INVENTION

It is thus an objective of the invention to provide automatic setting of conditions or ambiance in a local environment, such as a home. It is also an objective to provide automatic detection of the location of a particular person in the local environment and automatic setting of conditions or ambiance in the region of local environment in which the person is detected based on the preferences of the particular person. It is also an objective to provide automatic detection of the location of a particular user in the local environment using image recognition.

Accordingly, the invention provides a system comprising a control unit that receives images associated with one or more regions of a local environment. The local environment may be, for example, a home, and the two or more regions may be the rooms of the home, a wing or floor of the home, etc. The one or more regions are each serviced by one or more controllable devices or systems. For example, the controllable devices or systems may be the lights in a room, the heat level for a sector of the home, etc. The control unit processes the images to identify, from a group of known persons associated with the local environment, any known persons located in one or more of the regions. For a known person so identified in a respective region, the control unit retrieves from a database an indicium of the identified person's preference for at least one of the one or more controllable devices or systems that service the respective region in which the known person is located. The control unit generates control signals so that the one or more controllable devices or systems that service the respective region in which the identified person is located is adjusted to reflect the known person's preference.

Also, the invention provides a method for adjusting the conditions or ambiance of regions comprising a local environment. The method comprises capturing images associated with each of a number of regions of a local environment. From a group of known persons associated with the local environment, any known persons located in one or more of the regions are identified from the captured images. One or more preferences of an identified person are retrieved. The one or more preferences for the identified person are used to control one or more devices or systems associated with the region in which the identified person is located.

DETAILED DESCRIPTION

Figure 1:
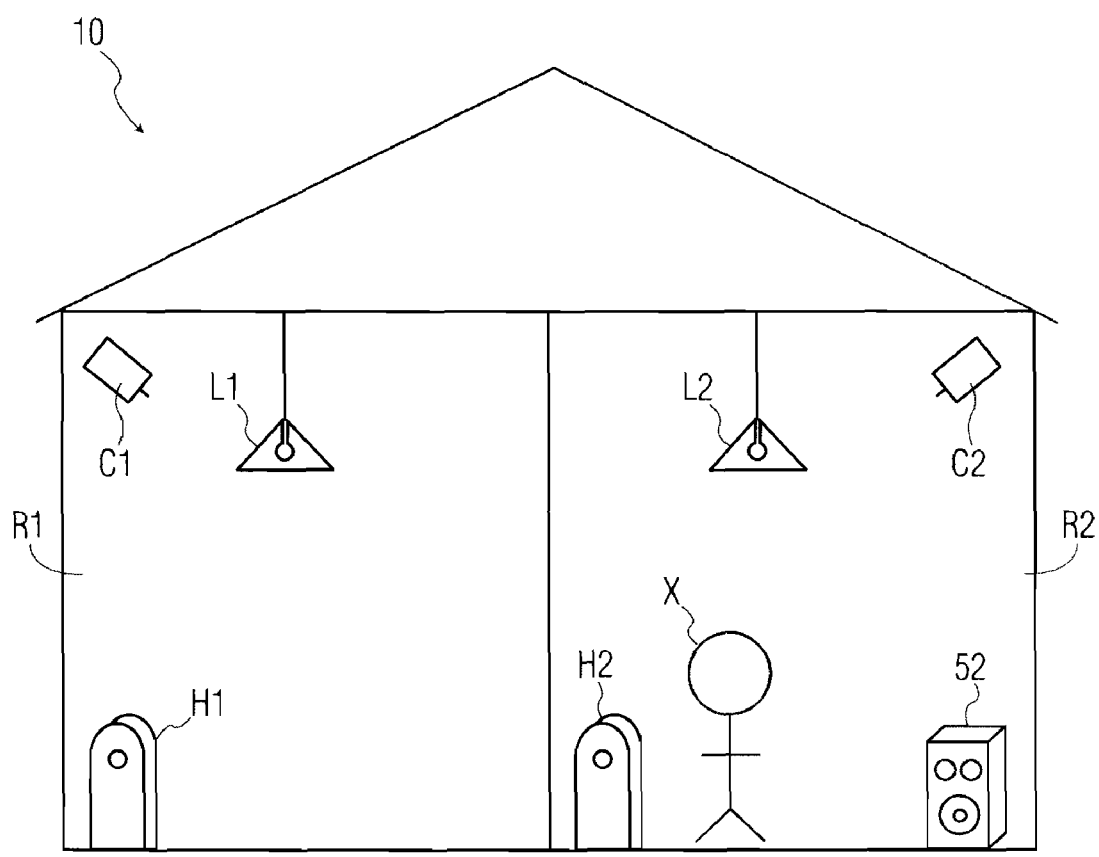
FIG. 1 is a representative view of an embodiment of the invention.

Referring to FIG. 1, a local environment comprising a home 10 is represented that supports an embodiment of the invention. Although a home is focused on in the ensuing description, the local environment may be any setting to which the invention may be applied, such as an office, store, hospital, hotel, camper, etc. The invention may be easily adapted to such other settings by one skilled in the art.

The home 10 is shown to be comprised of rooms R1, R2. Although R1, R2 are represented and referred to as rooms, they are generally intended to represent definable regions in the home, not just traditional rooms. For example, any of the regions may alternatively be a kitchen, hallway, stairway, garage, basement, storage space, etc. In addition, rooms R1, R2 in FIG. 1 are representative of other rooms in the home that have at least one controllable device or system that service the respective room. Any regions in the home that do not include systems or devices that are not controlled in accordance with the invention are not represented in FIG. 1, but it is understood that such regions may exist. For example, the systems and/or devices that are controlled in accordance with the invention may be found in certain regions of the home that are used more frequently, such as the bedrooms, kitchen, den and living room, and may be absent from regions of the home that are used less frequently, such as the hallways, stairways, basement and garage.

Each room R1, R2 in FIG. 1 is shown as having a camera C1, C2, respectively, or like image capturing device, that captures images within the room and, in particular, images of persons in the room. More than one camera may be used to cover a region, but for ease of description only one camera is represented as covering each region in FIG. 1 Thus, for example, camera C2 will capture images of person X when located as shown in room R2. Each room R1, R2 is also shown as having a respective light, L1, L2, that illuminates the room, as well as a respective heating unit H1, H2 that heats the room. Room R2 is serviced by an audio system that provides music through speaker S2. Light L1 and heating unit H1 are the systems and components of room R1 that are controlled in accordance with the invention. Similarly, light L2, heating unit H2 and speaker S2 are the systems and components of room R2 that are controlled in accordance with the invention. As will be described in more detail below, according to the invention, images from cameras C1, C2 are used to identify a known person in a respective room R1, R2. Once identified, the devices and/or systems that service the room in which the identified person is located is automatically adjusted or controlled in accordance with the individual preference of the identified person. For example, if person X is recognized by camera C1, the light L2, heat H2 and volume of music from speaker S2 in room R2 is automatically adjusted to the preferences of X.

Before proceeding, it is also noted that the particular devices and/or systems shown that service each room R1, R2 and which are controlled in accordance with the invention is for convenience to aid in describing the embodiment of the present invention. However, each room may include more or less and/or different devices or systems that service the room and are controlled according to the invention. One skilled in the art may readily adapt the description applied to the representative devices and systems described below to different and/or additional or fewer devices or systems found in any individual room.

In addition, it is also noted that each device and system is ascribed in FIG. 1 as servicing a particular room. However, any one device or system may service two or more rooms. For those servicing devices or systems, the servicing area of the device or system defines the room or local region and thus which cameras are used in controlling the device or system. For example, in FIG. 1, heating unit H2 may be absent and heating unit H1 may service both rooms R1, R2. Thus, for the purposes of the heating unit H1, the local region is rooms R1 and R2, and is adjusted according to the preference of a person identified by either C1 or C2. Similarly, speaker S2 may provide music to both rooms R1 and R2, so it's volume will be adjusted to the preference of an identified person located in either R1 or R2 (i.e., a person identified in an image captured by either C1 or C2).

Figure 2:
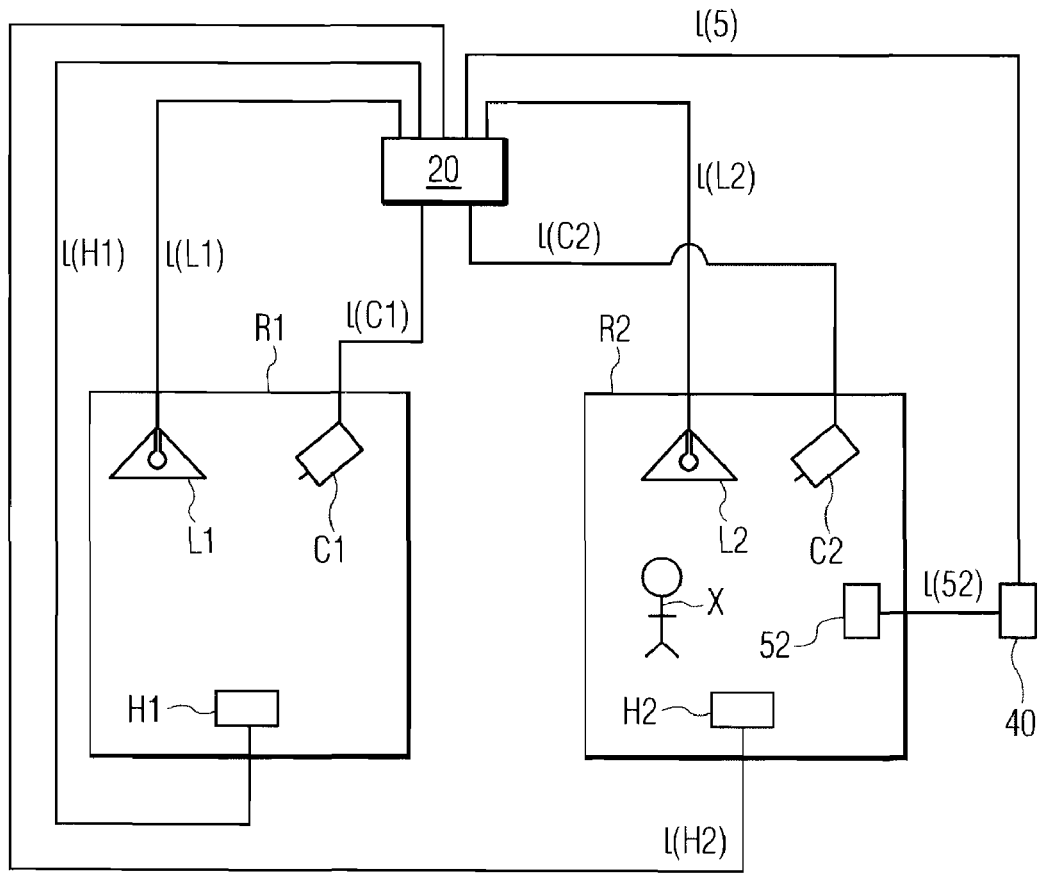
FIG. 2 is a more detailed representative view of the embodiment of the invention shown in FIG. 1.

Referring to FIG. 2, a more detailed (and somewhat more generalized) representation of the embodiment introduced in FIG. 1 is shown. Rooms R1, R2 are shown schematically, along with respective cameras C1, C2, respective lights L1, L2, and respective heating units H1, H2. For room R2, speaker S2 is also shown. For clarity, devices and/or systems that service a room and which are controlled according to the invention (such as L1, L2, H1, H2 and S2) may alternatively be referred to as a "servicing component".

Figure 2A:
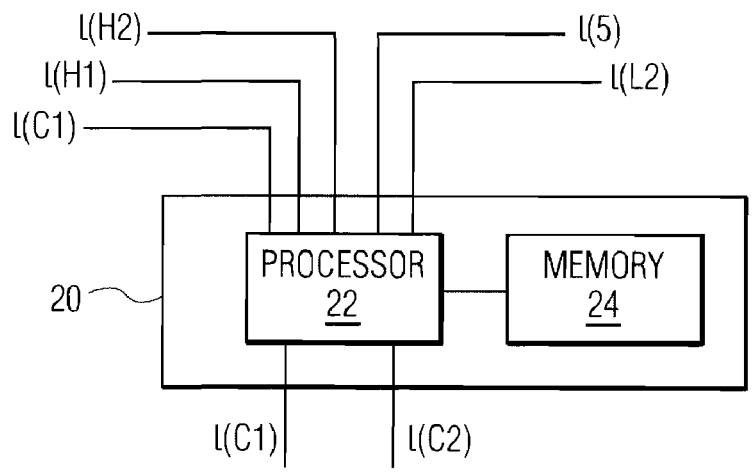
FIG. 2a depicts further details of a component of FIG. 2.

FIG. 2 shows additional components of the embodiment of the invention. Control unit 20 provides the central processing and initiation of control signals for the servicing components of rooms R1, R2. Control unit 20 may comprise any digital controller, processor, microprocessor, computer, server or the like, and any needed ancillary components (such as a memory, database, etc.) which can carry out the control processing and signal generation of the invention. Control unit 20 may comprise, for example, a processor 22 and memory 24, as shown further in FIG. 2a, and run software for determining and outputting appropriate control signals to the servicing components, which is described in further detail below. Cameras C1, C2 are connected to control unit 20 over data lines 1(C1), 1(C2), respectively. Data lines 1(C1), 1(C2) and like lines described below may comprise standard communication wires, optical fibers and like hardwired data lines. They may also represent wireless communication. Each camera C1, C2 thus provides images of the respective room R1, R2 in which it is located to the processor 22 of control unit 20. Thus, camera C1 provides images of room R1 to control unit 20 and camera C2 provides images of room R2 to control unit 20.

In addition, processor 22 of control unit 20 provides appropriate control signals to lights L1, L2 over lines 1(L1), 1(L2), respectively, for controlling the intensity of the respective lights L1, L2. For convenience, lines 1(L1), 1(L2) are shown in FIG. 2 as directly connected to lights L1, L2, respectively, but it is understood that lines 1(L1), 1(L2) actually provide control signals to dimming circuitry attached to each respective light L1, L2. Alternatively, lines 1(L1), 1(L2) may be input to a separate lighting controller that provides the appropriate dimming control signals to L1 and/or L2 based on the input received from control unit 20.

Processor 22 of control unit 20 also provides control signals over lines 1(H1), 1(H2) for controlling the temperature provided by heating units H1, H2 to rooms R1, R2, respectively. The control signals from control unit 20 over lines 1(H1), 1(H2) may comprise an appropriate temperature control signal for heating unit H1, H2, respectively. In a particular example of the heating system of FIG. 2, heating units H1, H2 are electric heaters that each have associated thermostats that receive control signals (in the form of a temperature setting) from control unit 20 over lines 1(H1), 1(H2), respectively.

For other common types of heating systems known in the art, the control signal provided by control unit 20 to heating elements H1, H2 shown in FIG. 2 is a more abstract representation of the actual underlying system. For example, for heat provided by a centralized source (such as a gas fired hot water furnace), control unit 20 may provide a temperature setting over line 1(H1) for a thermostat (not shown) in room R1. The thermostat consequently turns on a particular circulator attached to the furnace that provides hot water to baseboard heating elements comprising heating unit H1. In addition, lines 1(H1), 1(H2) may be input to a separate heating controller that provides the appropriate heating control signals to H1 and/or H2 based on the input received from control unit 20. Whatever the underlying heating system however, the control of the embodiment described with respect to FIG. 2 may be readily adapted by one skilled in the art.

Control unit 20 also provides control signals over line 1(S) to audio system 40. Audio system 40 provides music to speaker S2 in room R2 over line 1(S2) in accordance with the control signals received from control unit 20. The control unit 20 may provide signals to the audio system that set the volume level of speaker S2, the type of music selected for play (for example, particular CDs, a radio station or webcast, etc.), etc. Audio system 40 may be located in room R2, such as a stereo, but also may be a centralized audio system that provides music to other rooms in the home. Audio system 40 may include an internal processor that receives the control signals from control unit 20 and processes those signals to select the music to play, the volume of speaker S2 output over line 1(S2), etc.

Control unit 20 further comprises image recognition software that is stored in memory 24 and run by processor 22. The image recognition software processes the incoming images of each room R1, R2 received from cameras C1, C2, respectively. For convenience, the ensuing description will focus on the images received from a single camera, selected to be C1 of room R1, shown in FIG. 2. The description is also applicable to images received by control unit 20 from camera C2 located in room R2.

As noted, camera C1 captures images of room R1 and transmits the image data to control unit 20. The images are typically comprised of pixel data, for example, those from a CCD array in a typical digital camera. The pixel data of the images is assumed to be pre-processed into a known digital format that may be further processed using the image recognition software in control unit 20. Such pre-processing of the images may take place in a processor of the camera C1. Such processing of images by digital cameras (which provides the pre-processed image data to the control unit 20 for further processing by the image recognition software) is well known in the art and, for convenience, it's description will be omitted except to the extent necessary to describe the invention. While such pre-processing of the images of camera C1 may take place in the camera C1, it may alternatively take place in the processor 22 of control unit 20 itself.

Processor 22 includes known image recognition software loaded therein that analyzes the image data received from camera C1 via data line 1(C1). If a person is located in room R1, he or she will thus be depicted in the image data. The image recognition software may be used, for example, to recognize the contours of a human body in the image, thus recognizing the person in the image. Once the person's body is located, the image recognition software may be used to locate the person's face in the received image and to identify the person.

For example, if control unit 20 receives a series of images from camera C1, control unit 20 may detect and track a person that moves into the room R1 covered by camera C1 and, in particular, may detect and track the approximate location of the person's head. Such a detection and tracking technique is described in more detail in "Tracking Faces" by McKenna and Gong, Proceedings of the Second International Conference on Automatic Face and Gesture Recognition, Killington, Vt., Oct. 14-16, 1996, pp. 271-276, the contents of which are hereby incorporated by reference. (Section 2 of the aforementioned paper describes tracking of multiple motions.)

When the person is stationary in region R1, for example, when he or she sits in a chair, the movement of the body (and the head) will be relatively stationary. Where the software of the control unit 20 has previously tracked the person's movement in the image, it may then initiate a separate or supplementary technique of face detection that focuses on the portion of the subsequent images received from the camera C1 where the person's head is located. If the software of the control unit 20 does not track movements in the images, then the person's face may be detected using the entire image, for example, by applying face detection processing in sequence to segments of the entire image.

For face detection, the control unit 20 may identify a static face in an image using known techniques that apply simple shape information (for example, an ellipse fitting or eigensilhouettes) to conform to the contour in the image. Other structure of the face may be used in the identification (such as the nose, eyes, etc.), the symmetry of the face and typical skin tones. A more complex modeling technique uses photometric representations that model faces as points in large multi-dimensional hyperspaces, where the spatial arrangement of facial features are encoded within a holistic representation of the internal structure of the face. Face detection is achieved by classifying patches in the image as either "face" or "non-face" vectors, for example, by determining a probability density estimate by comparing the patches with models of faces for a particular sub-space of the image hyperspace. This and other face detection techniques are described in more detail in the aforementioned Tracking Faces paper.

Face detection may alternatively be achieved by training a neural network supported within the control unit 20 to detect frontal or near-frontal views. The network may be trained using many face images. The training images are scaled and masked to focus, for example, on a standard oval portion centered on the face images. A number of known techniques for equalizing the light intensity of the training images may be applied. The training may be expanded by adjusting the scale of the training face images and the rotation of the face images (thus training the network to accommodate the pose of the image). The training may also involve back-propagation of false-positive non-face patterns. The control unit 20 provides portions of the image to such a trained neural network routine in the control unit 20. The neural network processes the image portion and determines whether it is a face image based on its image training.

The neural network technique of face detection is also described in more detail in the aforementioned Tracking Faces paper. Additional details of face detection (as well as detection of other facial sub-classifications, such as gender, ethnicity and pose) using a neural network is described in "Mixture of Experts for Classification of Gender, Ethnic Origin and Pose of Human Faces" by Gutta, et al., IEEE Transactions on Neural Networks, vol. 11, no. 4, pp. 948-960 (July 2000), the contents of which are hereby incorporated by reference and referred to below as the "Mixture of Experts" paper.

Once a face is detected in the image, the control unit 20 provides image recognition processing to the face to identify the person. Thus, the image recognition processing is be programmed to recognize particular faces, and each face is correlated to the identity of a person. For example, for the home represented in the embodiment of FIGS. 1 and 2, the image recognition processing is programmed to recognize the faces of the family members and/or other residents that reside in the home, and each face is correlated to the identity of the family member/resident. The neural network technique of face detection described above may be adapted for identification by training the network using the faces of those persons who must be identified. Faces of other persons may be used in the training as negative matches (for example, false-positive indications). Thus, a determination by the neural network that a portion of the image contains a face image will be based on a training image for a known (identified) person, thus simultaneously providing the identification of the person. So programmed, the neural network provides both face detection and identification of the person. Alternatively, where a face is detected in the image using a technique other than a neural network (such as that described above), the neural network procedure may be used to confirm detection of a face and to also provide identification of the face.

As another alternative technique of face recognition and processing that may be programmed in control unit 20, U.S. Pat. No. 5,835,616, "FACE DETECTION USING TEMPLATES" of Lobo et al, issued Nov. 10, 1998, hereby incorporated by reference herein, presents a two step process for automatically detecting and/or identifying a human face in a digitized image, and for confirming the existence of the face by examining facial features. Thus, the technique of Lobo may be used in lieu of, or as a supplement to, the face detection and identification provided by the neural network technique after the initial tracking of a moving body (when utilized), as described above. The system of Lobo et al is particularly well suited for detecting one or more faces within a camera's field of view, even though the view may not correspond to a typical position of a face within an image. Thus, control unit 20 may analyze portions of the image for an area having the general characteristics of a face, based on the location of flesh tones, the location of non-flesh tones corresponding to eye brows, demarcation lines corresponding to chins, nose, and so on, as in the referenced U.S. Pat. No. 5,835,616.

If a face is detected, it is characterized for comparison with reference faces for family members who reside in the home (which are stored in database 22), as in the referenced U.S. Pat. No. 5,835,616. This characterization of the face in the image is preferably the same characterization process that is used to characterize the reference faces, and facilitates a comparison of faces based on characteristics, rather than an 'optical' match, thereby obviating the need to have two identical images (current face and reference face) in order to locate a match. In a preferred embodiment, the number of reference faces is relatively small, typically limited to the number of people in a home, office, or other small sized environment, thereby allowing the face recognition process to be effected quickly. The reference faces stored in memory 24 of control unit 20 have the identity of the person associated therewith; thus, a match between a face detected in the image and a reference face provides an identification of the person in the image.

Thus, the memory 24 and/or software of control unit 20 effectively includes a pool of reference images and the identities of the persons associated therewith. Using the images received from camera C1, the control unit 20 effectively detects and identifies a known person (or persons) when located in room R1 by locating a face (or faces) in the image and matching it with an image in the pool of reference images. The "match" may be detection of a face in the image provided by a neural network trained using the pool of reference images, or the matching of facial characteristics in the camera image and reference images as in U.S. Pat. No. 5,835,616, as described above. Using the images received from camera C2, the control unit 20 likewise detects and identifies a known person (or persons) when located in room R2.

When an image of a known person (such as a family member) located in a room is identified in the control unit 20 by applying the image recognition software to the images received from the camera in the room, the processor 22 then executes control software so that the servicing components of the room in which the person is located are automatically adjusted by the control unit 20 according to the individual preference of the identified person. Memory 24 of control unit 20 includes each family member's preference for room lighting (i.e., the settings of lights L1 and L2), room temperature (i.e., the settings of heating units H1 and H2) and audio volume (i.e., the setting of volume of speaker S2). Each family member's set of preferences stored in memory 24 is correlated to the identity of the family member. Processor 22 uses the identification of the family member to access the preferences for the identified family member from memory 24. The preferences of the family member applicable to the servicing components of the room in which he or she is located is then utilized by the control software of the processor 22 to format and output control commands to the servicing components in the room.

For example, family member X is shown as located in room R2 in FIGS. 1 and 2. Images of X are captured by camera C2 and sent to control unit 20 via line 1(C2). Processor 22 uses image recognition software (along with reference image data of family members stored in memory 24) to identify the family member as family member X. Processor 22 then uses the identity of family member X to retrieve preferences for family member X stored in memory for servicing components in the home. Processor 22 considers the preferences of family member X for those servicing components located in room R2, since the image of X came from camera C2 (i.e., over line 1(C2)). Thus, processor 22 retrieves X's preferences for the intensity of light L2, temperature for heating unit H2 and volume of speaker S2. Processor 22 may retrieve all preferences of X from memory 24 first and then determine which are related to the servicing components associated with R2. Alternatively, processor 22 may address and retrieve from memory 24 only those preferences related to the servicing components of R2.

For each preference retrieved for X from memory that corresponds to a servicing component in R2, processor 22 formats a command for the corresponding servicing component in room R2 in accordance with the preference and outputs it to the component over the appropriate line. For person X in room R2, X's preference for the intensity of lighting is used by processor 22 to generate an intensity control command that is formatted to control light L2 in accordance with the preference. The intensity control command is output to light L2 over line 1(L2) and light L2 is consequently adjusted to X's preferred intensity automatically. Similarly, X's preference for room temperature is used by processor 22 to generate a control command formatted to control heating unit H2 in accordance with X's preference. The command is output to H2 over line 1(H2) and heating unit H2 is consequently adjusted to X's preferred temperature automatically.

In like manner, the output of stereo speaker S2 is adjusted to X's preferred volume automatically. X's preference retrieved from memory for audio volume is used by processor 22 to generate a volume control command formatted to control audio system 40 in accordance with the preference. The volume control command is output to audio system 40 over line 1(S), and audio system 40 consequently adjusts the volume level output by audio system 40 to speaker S2 in room R2 according to the preference. Audio system 40 may also have additional functions that may be controlled externally by processor 22, such as power on and off and music selection. In that case, when family member X is identified in room R2, the preferences retrieved from memory 24 pertaining to audio may include whether X normally wants the audio system turned on, the type of music X likes, for example, the particular CDs in a CD jukebox or a particular CD radio station, and the volume. The control signals formatted and sent to audio system 40 by processor 22 reflect the preferences of person X for the additional functions. For example, the control signals reflecting X's preferences may turn on the audio system, tune the audio system tuner to a particular pop radio station, and adjust the volume of speaker S2 to a moderately loud level.

Images from cameras C1 and C2 may be captured and transmitted to control unit 20 continuously or periodically. Control unit 20 periodically processes the images received to identify known persons in the respective rooms and control servicing components in the manner described. When servicing components in a room are adjusted according to the preferences of a known person in the room, a temporary record may be created indicating such. While the known person remains in the room, subsequent images of the known person in the room are processed by control unit 20 and again identify the known person in the room. However, the temporary record indicates to the control unit 20 that the servicing components have previously been adjusted according to the person's preferences and control signals are not again generated and transmitted to the servicing components for the room for those received images. When the known person is no longer found in subsequent images from the room (indicating the person has left the room), the temporary record for the room is erased, and full processing by the control unit for subsequent images continues. This includes generation and transmission of control signals corresponding to preferences of known persons newly identified in the room in subsequent images. If X moves to another room, for example, to room R1, the lighting provided by L1 and the heat provided by heating unit H1 are automatically adjusted in like manner. That is, images captured by camera C1 are transmitted to control unit 20 over line 1(C1). Image recognition software is applied to the images by processor 22, thus identifying family member X in room R1. Preferences for family member X are then retrieved by processor 22 from memory 24. Control signals reflecting those preferences are transmitted to light L1 and heating unit Hi over lines 1(L1) and 1(H1) respectively. The intensity of light L1 and the room temperature provided by heating unit H1 is consequently adjusted to X's preferences automatically.

Also, when X vacates R2, the images provided by camera C2 and analyzed by the image recognition software of control unit 20 will not identify a known person currently in room R2. When the control unit 20 determines that nobody is located in a particular room, the settings of the servicing components may be set to a default setting. For example, when X vacates room R2, control signals may be sent by processor 22 to turn off light L2, reduce the thermostat setting of heating unit to 65 degrees, and switch off either the audio system 40 or the volume output by speaker S2. In addition, if the control unit 20 determines that there is a person located in a room, but cannot identify the person, other default control signals may be sent to one or more of the servicing components. For example, for safety, light L2 may be turned on and set to a medium intensity level, so that the unidentified person (for example, a guest) can see where he or she is going.

If more than one family member is located in a room, then the image recognition software will consequently identify more than one family member in the image received. The preferences stored in memory 24 for the various servicing components may be different. For example, if family members X and Y are located in room R2, each may have a different preference for the volume of music output by speaker S2. For such cases, the control software may include priority rules for determining how to control the speaker and other servicing components. For example, if family member X is a parent and family member Y is a child, the preferences for X may be chosen over Y. On the other hand, if X and Y are brothers, and room R2 is X's bedroom, then X's preferences may supersede Y's. Preferences may also govern certain servicing components in a room for a person of higher priority located in another room. For example, if parent X is identified in a room adjacent to R2, then the parent's preference for the level of speaker S2 in room R2 may supersede the preference of child Y actually located in R2. If no preference is defined between persons located in the same room, then certain default rules may apply. For example, for speaker volume, the lowest preferred volume may govern. On the other hand, for room temperature, the highest preferred volume may govern. For lighting, an intensity that reflects the average of the preferences may be used.

Preferences may also be a function of other factors, such as time of day, day of the week or year, etc. For example, if room R2 has good natural lighting then X's preference for L2 may reflect that L2 is "off" in the middle of the day, set at medium intensity after 6 p.m. in the winter months, and set at a medium intensity after 8 p.m. in the spring, summer and fall.

The image recognition processing may also detect gestures in addition to the identity of a family member. The control unit 20 may be programmed to detect certain predefined gestures and make corresponding adjustments to one or more of the servicing components in the room in which the identified family member is located. A detected gesture may override the family member's stored preference for the servicing component. For example, in the example above, when X is identified as located in room R2, the volume output by speaker S2 is automatically adjusted to the X's preference stored in memory 24. However, if X does not want to listen to music, X may hold up three fingers toward camera C2. The gesture is captured in the images and detected by the image recognition software of control unit 20, which is further programmed to send a corresponding control signal to audio system 40 to switch off or otherwise mute speaker S2. Further details on recognition of gestures from images are found in "Hand Gesture Recognition Using Ensembles Of Radial Basis Function (RBF) Networks And Decision Trees" by Gutta, Imam and Wechsler, Int'l Journal of Pattern Recognition and Artificial Intelligence, vol. 11, no. 6, pp. 845-872 (1997), the contents of which are hereby incorporated by reference.

Preferences for known persons may be manually input to the control unit 20 and stored in memory 24, for example, via a graphic user interface (not shown). The interface provides appropriate menus for the various servicing components in the home or other local environment when processor 22 is put into a preference input mode. For example, for known person X inputting his or her preferences, the interface may first present a set of thumbnail images of known persons. The images may be selected from the reference images for known persons stored in memory 24 for the image recognition software. X inputs his or her identity by selecting his or her image from the set of images. Subsequent menus presented to X allow preferences to be selected for lighting, heating, speaker volume, etc. for the various servicing components throughout the home. The input preferences associated with family member X are stored in memory 24.

Of course, preferences that are input for a family member and stored in memory 24 need not be the actual personal preferences of the family member. For example, a parent may input some or all of the preferences for the children in the home. For example, the parent may input the children's preferences so that the stereo volume level, room temperature level, etc. associated with the children are reasonable.

Alternatively, preferences may be learned by control unit 20 by monitoring the settings actually input to servicing components themselves in the home by family members. For example, control unit 20 may be put into a "learning mode" over a number of days or weeks. During that time, when a person enters a room, he or she is identified via the image recognition software, as described above. Lines between the various servicing components in the room and the control unit 20 transfer data in both directions, thus enabling the control unit 20 to detect and record the settings selected by the person for the servicing components themselves.

Preferences are created for each of the identified persons based upon the manual settings selected for the various servicing components during the learning mode. For example, during the learning mode, control unit 20 may record that X set the intensity of light L2 in room R2 twenty times and that the average setting of the light was 7 on a scale of 10. When the learning mode is complete, X's preference for light L2 is stored as 7. Where one general lighting preference is stored for a person, not preferences for individual lights in the home, then control unit may record and average the intensity levels selected by X for all lights throughout the home during the learning mode. Later, when a particular light (such as L2) is automatically adjusted for X, processor 20 retrieves the general lighting preference for X and, based on the retrieved preference, generates a control signal that is formatted to output the preferred intensity for L2. Preferences for other known persons and other servicing components are created in the learning mode in analogous manner.

As previously noted, the rooms shown in FIGS. 1 and 2 are representative of the above-described embodiment. Home 10 may have additional rooms, serviced by like and/or different servicing components than the heating units, lights and audio system/speaker shown in FIGS. 1 and 2. Other controllable servicing components may include automated windowshades, televisions and associated DVDs and VCRs, automatic garage door openers, etc. Audio system 40 that controls speaker S2 in room R2 may drive other speakers in other rooms, which may be with different music at different volumes depending on the preference of a person in another room. Additional servicing components and rooms (along with the attendant camera(s)) may be added by suitable wiring and programming of control unit 20.

In addition, certain servicing components may be controlled according to a failure to identify a person in an image. For example, a security system controlled by the system of the invention may be activated when the control unit 20 detects the image of a person received from anywhere in the home, but fails to identify the person.

As also previously noted, the servicing components of the embodiment shown in FIGS. 1 and 2 are shown as servicing one room, either R1 or R2. Thus, for example, L1 provides light for room R1, but not R2. However, one servicing component may service two or more rooms, such as both R1 and R2. For example, heating unit H1 may provide heat to both room R1 and R2. Similarly, the intensity of lights L1 and L2 may both be controlled by a single dimmer switch. In these examples, the region covered by the servicing component encompasses two traditional rooms (R1 and R2) in the home R1. In such cases, the coverage area of the servicing component defines the extent of the local region or "room" in the control unit for the component and which images from cameras are used by the control unit to control the servicing component. For example, if L1 and L2 are both controlled by a single dimmer switch in FIG. 2, then a single control line extends from the control unit 20 to the dimmer switch, and a separate line extends from the dimmer switch to each of lights L1 and L2. Control unit 20 therefore controls the intensity of lights L1 and L2 using the preference of any known person identified in R1 and R2, that is, using images received from both cameras C1 and C2. If more than one person is identified in rooms R1 and R2, then control unit 20 uses priority rules as described above to determine which identified person's preference governs. It is noted that the composite region of R1 and R2 defined by the servicing component L1 and L2 in this example overlaps other regions, in this case region R1 (serviced by servicing component H1) and region R2 (serviced by servicing components H2 and S2).

Figure 3:
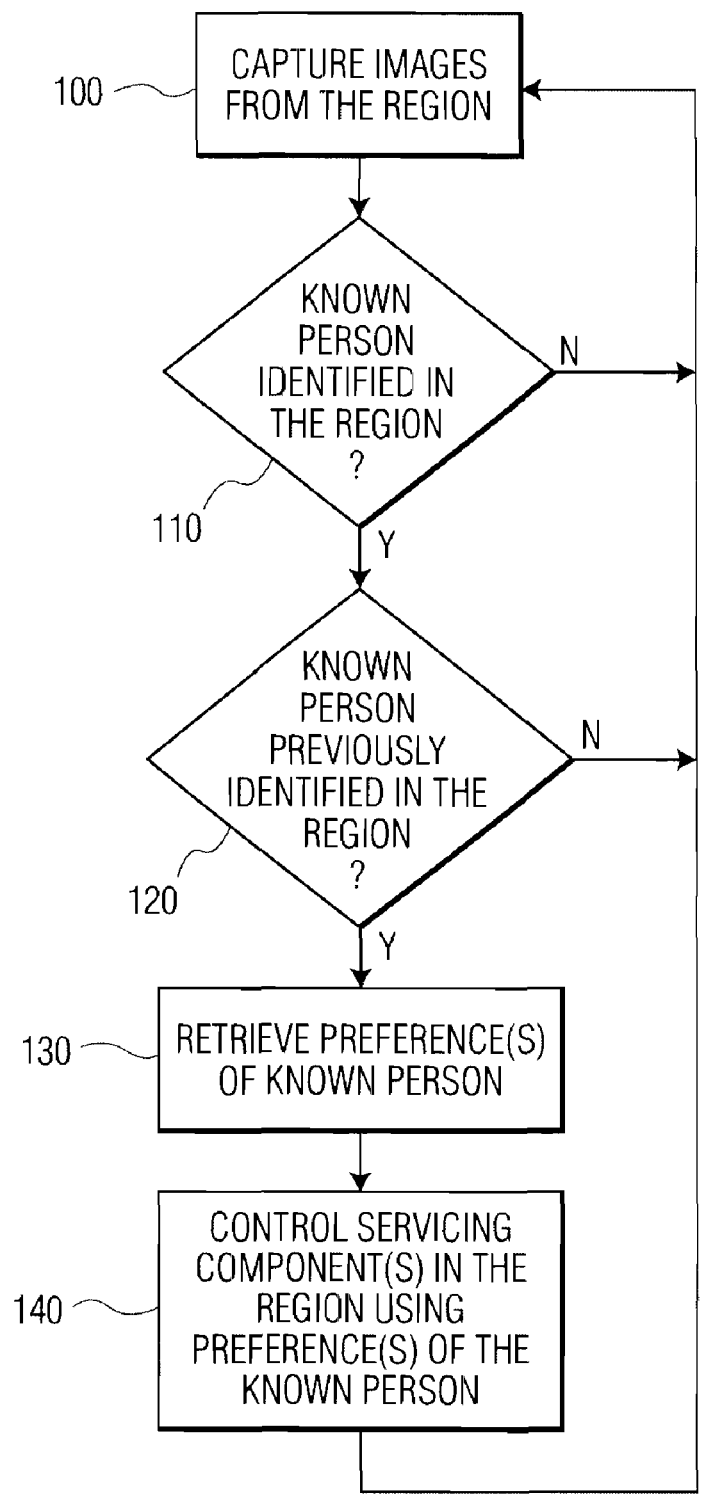
FIG. 3 is a flow-chart of an embodiment of a method in accordance with the invention

FIG. 3 presents a flow-chart of a generalized method included within the present invention and which may be gleaned from the embodiments described above. In step 100, images of a region are captured. In step 110, a known person, if any, is identified in the images. If a known person is identified, it is determined in step 120 whether the known person has recently been identified in the region and servicing components have previously been controlled according to the preference of the person. If not, one or more preferences are retrieved for the identified person in step 130. One or more servicing components in the region are controlled using the one or more preferences of the known person in step 140. The method is repeated for the region under consideration, as represented by the line connecting step 140 back to step 100. A delay of time may be interposed before the method is repeated. Other regions in a local environment may be processed in like manner, either concurrently (in a multiplexed fashion, for example), or in sequence. The steps of the method may be modified and/or additional steps may be readily be incorporated to the method represented in FIG. 3 to encompass other aspects of the embodiments discussed above. Thus, for example, when more than one known person is identified in a region, step 130 may be modified to retrieve the preferences of all known persons identified in the region, and step 140 may be modified to control the one or more servicing components using the preferences of the known persons in conjunction with a priority scheme, as described above for example.

What is claimed is:

1. A system comprising a control unit that receives images associated with one or more regions of a home, the one or more regions each being serviced by one or more servicing components, the control unit processing the images to identify, from a group of known persons associated with the home, any one or more known persons located in the regions and, for the regions in which one or more known person is identified, automatically generating a control signal for at least one of the servicing components associated with the region, the control signal reflecting a preference of at least one of the known persons located in the respective region.

2. A system comprising a control unit that receives images associated with one or more regions of a stationary structure, the one or more regions each being serviced by one or more servicing components, the control unit processing the images to identify, from a group of known persons associated with the stationary structure, any one or more known persons located in the regions and, for the regions in which one or more known person is identified, automatically generating a control signal for at least one of the servicing components associated with the region, the control signal reflecting a preference of at least one of the known persons located in the respective region, the system further comprising at least one camera associated with each of the one or more regions of the stationary structure that provide the control unit with the images associated with the one or more regions, images captured by the at least one camera associated with each region being processed to identify any known persons located in the region.

3. The system of claim 2, wherein the control unit applies image recognition software to the received images to identify any one or more known persons located in the regions.

4. The system of claim 3, wherein the image recognition software uses stored reference image data of the known persons associated with the stationary structure to identify any one or more known persons located in the regions.

5. The system as in claim 1, wherein the control unit retrieves preferences stored for the one or more known persons identified as located in the regions.

6. The system as in claim 5, wherein, for the regions in which one or more known person is identified, the control signal generated for the at least one of the servicing components associated with the region is based upon at least one of the preferences retrieved for at least one of the known persons located in the region.

7. The system as in claim 1, further comprising a memory that interfaces with the control unit, the memory storing preferences for each of the group of known persons relating to the one or more servicing components servicing the one or more regions, the preferences for an identified person being retrievable from the memory by the control unit.

8. The system as in claim 1, wherein the servicing components are selected from a group comprised of lights, heating units and audio systems.

9. The system of claim 1, wherein one of the servicing components associated with one of the regions is a heating unit, the control signal generated for the heating unit reflecting a room temperature preference of at least one of the known persons located in the one region.

10. The system of claim 1, wherein one of the servicing components associated with one of the regions is a light, the control signal generated for the light reflecting a lighting preference of at least one of the known persons located in the one region.

11. The system of claim 1, wherein one of the servicing components associated with one of the regions is an audio system, the control signal generated for the audio system reflecting at least one of an audio volume preference and a music type preference of at least one of the known persons located in the one region.

12. A method for controlling a servicing component located in a region of a stationary structure, the method comprising the steps of:
   a) capturing images associated with the region;
   b) identifying, from a group of known persons each associated with the stationary structure, a known person in the region from the captured images associated with the region;
   c) retrieving a preference of the identified person, the preference related to the servicing component, wherein the step of retrieving a preference includes retrieving the preference from a memory using the identity determined in the identifying step; and
   d) controlling the servicing component according to the retrieved preference of the identified person;
   wherein steps a)-d) are performed for one or more additional regions in the stationary structure.

13. The method as in claim 12, wherein the step of identifying a known person in the region from the captured images includes the step of processing the captured images with image recognition software.

14. The method as in claim 12, wherein the step of controlling the servicing component according to the retrieved preference of the identified person includes generating a control signal for the servicing component that reflects the preference and transmitting the control signal to the servicing component.

15. The method as in claim 12, wherein steps c) and d) are performed for one or more additional servicing components in the region.

16. A computer readable storage medium including instructions which, when executed by a computer, carries out a method comprising:

receiving an image input associated with one or more regions of a home, the one or more regions each being serviced by one or more servicing components;

processing the images input in conjunction with data comprising a group of known persons associated with the home, to identify any one or more known persons located in the regions;

for the regions in which one or more known person is identified, accessing a memory to retrieve a preference of at least one of the known persons located in the respective region for at least one of the servicing components associated with the region; and generating a control signal for the at least one of the servicing components associated with the region based upon the retrieved preference.

17. The system of claim 2 wherein the stationary structure is selected from the group comprising a dwelling and a building.

18. The system of claim 1 wherein the preference is a function of a time of day, a day of the week, or a time of the year.

19. The method of claim 16 including using, for a region in which more than one person is identified, a priority rule to establish a preference, and wherein the control signal is based on the established preference.

20. A system comprising a control unit that receives images associated with one or more regions of a building, the one or more regions each being serviced by one or more servicing components, the control unit processing the images to identify, from a group of known persons associated with the building, any one or more known persons located in the regions and, for the regions in which one or more known person is identified, automatically generating a control signal for at least one of the servicing components associated with the region, the control signal reflecting a preference of at least one of the known persons located in the respective region.

21. The system according to claim 20, wherein the preferences are pre-established and the system includes a memory that interfaces with the control unit, the memory storing pre-established preferences for each of the group of known persons relating to the one or more servicing components servicing the one or more regions, the pre-established preferences for an identified person being retrievable from the memory by the control unit, wherein the controller includes a preference input mode, and wherein the pre-established preferences for each of the group of known persons relating to the one or more servicing components servicing the one or more regions are input manually via an external input interface with the control unit when the controller is in the preference input mode.

22. The system according to claim 20, wherein the system includes a memory that interfaces with the control unit, the memory storing preferences for each of the group of known persons relating to the one or more servicing components servicing the one or more regions, the preferences for an identified person being retrievable from the memory by the control unit, and wherein the preferences for each of the group of known persons relating to the one or more servicing components servicing the one or more regions are generated by the control unit in a learning mode.

23. The system according to claim 20, wherein at least one of the one or more regions of the building is defined by a room of the building.

24. The system of claim 23, wherein the control unit receives images associated with a first room of the building and wherein at least one of the servicing components has an extent of coverage which includes the first room and a second room of the building.

* * * * *